United States Patent
Wagner, Jr. et al.

(10) Patent No.: US 9,667,514 B1
(45) Date of Patent: May 30, 2017

(54) ELECTRONIC DISCOVERY SYSTEM WITH STATISTICAL SAMPLING

(71) Applicant: DiscoverReady LLC, New York, NY (US)

(72) Inventors: James Kenneth Wagner, Jr., Atlanta, GA (US); John T. Ritter, Charlotte, NC (US); Stephen John Barsony, King of Prussia, PA (US); Stephen H. Schreiber, Warren, MI (US); Merideth L. Helgeson, Charlotte, NC (US); Macyl A. Burke, Valencia, CA (US); David Matthew Shub, Cranford, NJ (US); Yerachmiel Tzvi Messing, Baltimore, MD (US); Philip L. Richards, Charlotte, NC (US)

( * ) Notice: Subject to any disclaimer, the term of this patent is extended or adjusted under 35 U.S.C. 154(b) by 619 days.

(21) Appl. No.: 13/754,800

(22) Filed: Jan. 30, 2013

Related U.S. Application Data

(60) Provisional application No. 61/592,493, filed on Jan. 30, 2012.

(51) Int. Cl.
*G06F 11/30* (2006.01)
*H04L 12/26* (2006.01)
*G06F 17/30* (2006.01)

(52) U.S. Cl.
CPC ........ *H04L 43/06* (2013.01); *G06F 17/30011* (2013.01)

(58) Field of Classification Search
CPC .......... G06F 17/30011; G06F 17/3005; G06F 17/3007; G06F 17/3089; G06F 17/30896; G06Q 10/10; H04L 43/06

USPC ................ 709/224, 223, 217–219; 715/200; 705/311; 707/705, 736–747

See application file for complete search history.

(56) References Cited

U.S. PATENT DOCUMENTS

| | | |
|---|---|---|
| 5,832,470 A | 11/1998 | Morita et al. |
| 6,356,899 B1 | 3/2002 | Chakrabarti et al. |
| 6,389,413 B2 | 5/2002 | Takahashi et al. |
| 6,687,696 B2 | 2/2004 | Hofmann et al. |
| 6,694,331 B2 | 2/2004 | Lee |
| 6,738,760 B1 | 5/2004 | Krachman |
| 6,778,977 B1 | 8/2004 | Avadhanam et al. |
| 7,328,216 B2 | 2/2008 | Hofmann et al. |

(Continued)

FOREIGN PATENT DOCUMENTS

| | | |
|---|---|---|
| EP | 1588535 A1 | 10/2005 |
| EP | 2113850 A2 | 11/2009 |

(Continued)

*Primary Examiner* — Kenneth R Coulter
(74) *Attorney, Agent, or Firm* — Mintz Levin Cohn Ferris Glovsky and Popeo, P.C.

(57) ABSTRACT

A sampler tool for an electronic discovery system implementing an electronic discovery workflow is provided. The sampler tool defines a workflow, identifies, a data set, then calculates results and generates reports and archival records. In particular, the sampler tool calculates and/or obtains various metrics characterizing the workflow and generates reports based on such metrics. These reports can serve as historical snapshots which can be used for quality control purposes and/or to provide support regarding the efficacy of the data selection process or large-scale document review in the context of the electronic discovery process. Related apparatus, systems, techniques and articles are also described.

24 Claims, 7 Drawing Sheets

(56) References Cited

U.S. PATENT DOCUMENTS

| | | | |
|---|---|---|---|
| 7,366,714 B2 | 4/2008 | Krachman | |
| 7,475,107 B2* | 1/2009 | Maconi et al. | 709/202 |
| 7,480,251 B2 | 1/2009 | Foschiano et al. | |
| 7,519,589 B2 | 4/2009 | Charnock et al. | |
| 7,519,673 B2 | 4/2009 | Zakarian et al. | |
| 7,556,806 B2 | 7/2009 | Wang | |
| 7,574,433 B2 | 8/2009 | Engel | |
| 7,593,995 B1 | 9/2009 | He et al. | |
| 7,617,195 B2 | 11/2009 | Liang et al. | |
| 7,640,323 B2 | 12/2009 | Sun | |
| 7,644,138 B2 | 1/2010 | Sun | |
| 7,657,522 B1 | 2/2010 | Puzicha et al. | |
| 7,657,603 B1 | 2/2010 | He et al. | |
| 7,671,187 B2 | 3/2010 | Aguirre et al. | |
| 7,680,773 B1 | 3/2010 | Acharya et al. | |
| 7,692,807 B1 | 4/2010 | Sanders et al. | |
| 7,716,196 B2* | 5/2010 | Ghielmetti et al. | 707/705 |
| 7,730,113 B1* | 6/2010 | Payette et al. | 707/821 |
| 7,743,051 B1 | 6/2010 | Kashyap et al. | |
| 7,747,455 B2 | 6/2010 | Barr et al. | |
| 7,747,631 B1 | 6/2010 | Puzicha et al. | |
| 7,761,427 B2 | 7/2010 | Martin et al. | |
| 7,779,152 B2 | 8/2010 | Narayanan | |
| 7,791,355 B1 | 9/2010 | Esher et al. | |
| 7,792,945 B2 | 9/2010 | Paknad et al. | |
| 7,801,761 B2 | 9/2010 | Varadarajan et al. | |
| 7,890,440 B1 | 2/2011 | Hardy | |
| 7,933,859 B1 | 4/2011 | Puzicha et al. | |
| 8,296,309 B2* | 10/2012 | Brassil et al. | 707/758 |
| 8,396,871 B2 | 3/2013 | Barsony et al. | |
| 8,706,742 B1 | 4/2014 | Ravid et al. | |
| 8,769,708 B2 | 7/2014 | Messing et al. | |
| 8,818,996 B2* | 8/2014 | Barney | G06F 17/30675 707/722 |
| 2003/0105765 A1 | 6/2003 | Smith et al. | |
| 2004/0243391 A1* | 12/2004 | Nelson et al. | 704/2 |
| 2006/0053104 A1 | 3/2006 | Ferrari et al. | |
| 2006/0085216 A1* | 4/2006 | Guerrero | 705/1 |
| 2007/0244915 A1 | 10/2007 | Cha et al. | |
| 2008/0033904 A1* | 2/2008 | Ghielmetti et al. | 707/1 |
| 2008/0038286 A1 | 2/2008 | Geng et al. | |
| 2008/0065811 A1 | 3/2008 | Jahangiri | |
| 2008/0081781 A1 | 4/2008 | Lippa et al. | |
| 2008/0082929 A1 | 4/2008 | Stignani et al. | |
| 2008/0108713 A1 | 5/2008 | Begovich et al. | |
| 2008/0219557 A1 | 9/2008 | Dawson et al. | |
| 2008/0229037 A1 | 9/2008 | Bunte et al. | |
| 2008/0244034 A1 | 10/2008 | Shannon et al. | |
| 2008/0282355 A1 | 11/2008 | Nemazi et al. | |
| 2008/0319984 A1 | 12/2008 | Proscia et al. | |
| 2009/0030754 A1 | 1/2009 | McNamar | |
| 2009/0055503 A1 | 2/2009 | Crivella et al. | |
| 2009/0076142 A1 | 3/2009 | Han et al. | |
| 2009/0077136 A1 | 3/2009 | Igawa et al. | |
| 2009/0089539 A1 | 4/2009 | Bunker et al. | |
| 2009/0097662 A1 | 4/2009 | Olechowski et al. | |
| 2009/0106239 A1 | 4/2009 | Getner et al. | |
| 2009/0106276 A1* | 4/2009 | Bouchard | 707/100 |
| 2009/0111976 A1 | 4/2009 | Aguirre et al. | |
| 2009/0125506 A1 | 5/2009 | Kim | |
| 2009/0150168 A1 | 6/2009 | Schmidt | |
| 2009/0150431 A1 | 6/2009 | Schmidt et al. | |
| 2009/0150866 A1 | 6/2009 | Schmidt | |
| 2009/0150906 A1 | 6/2009 | Schmidt et al. | |
| 2009/0164435 A1 | 6/2009 | Routt | |
| 2009/0164522 A1 | 6/2009 | Fahey | |
| 2009/0164588 A1 | 6/2009 | D'Amato et al. | |
| 2009/0164790 A1 | 6/2009 | Pogodin | |
| 2009/0165026 A1 | 6/2009 | Paknad et al. | |
| 2009/0187797 A1 | 7/2009 | Raynaud-Richard et al. | |
| 2009/0192944 A1 | 7/2009 | Sidman et al. | |
| 2009/0198651 A1 | 8/2009 | Shiffer et al. | |
| 2009/0198670 A1 | 8/2009 | Shiffer et al. | |
| 2009/0198674 A1 | 8/2009 | Custis et al. | |
| 2009/0198677 A1 | 8/2009 | Sheehy et al. | |
| 2009/0198689 A1 | 8/2009 | Frazier et al. | |
| 2009/0199274 A1 | 8/2009 | Frazier et al. | |
| 2009/0216696 A1 | 8/2009 | Downs et al. | |
| 2009/0233850 A1 | 9/2009 | McFadden et al. | |
| 2009/0254572 A1 | 10/2009 | Redlich et al. | |
| 2009/0262682 A1 | 10/2009 | Khetawat et al. | |
| 2009/0262683 A1 | 10/2009 | Khetawat et al. | |
| 2009/0262684 A1 | 10/2009 | Khetawat et al. | |
| 2009/0262702 A1 | 10/2009 | Khetawat et al. | |
| 2009/0262703 A1 | 10/2009 | Khetawat et al. | |
| 2009/0262704 A1 | 10/2009 | Khetawat et al. | |
| 2009/0264095 A1 | 10/2009 | Khetawat et al. | |
| 2009/0264126 A1 | 10/2009 | Khetawat et al. | |
| 2009/0265199 A1 | 10/2009 | Moerdler et al. | |
| 2009/0265542 A1 | 10/2009 | Khetawat et al. | |
| 2009/0265543 A1 | 10/2009 | Khetawat et al. | |
| 2009/0265609 A1 | 10/2009 | Rangan et al. | |
| 2009/0270423 A1 | 10/2009 | Blackwell et al. | |
| 2009/0276413 A1 | 11/2009 | Uchida | |
| 2009/0276467 A1 | 11/2009 | Scholtes et al. | |
| 2009/0287685 A1 | 11/2009 | Charnock et al. | |
| 2009/0319312 A1 | 12/2009 | Moerdler et al. | |
| 2009/0319506 A1 | 12/2009 | Ngan | |
| 2009/0326969 A1 | 12/2009 | Paknad et al. | |
| 2009/0327048 A1 | 12/2009 | Kisin et al. | |
| 2009/0327049 A1 | 12/2009 | Kisin et al. | |
| 2009/0327375 A1 | 12/2009 | Paknad et al. | |
| 2010/0017239 A1 | 1/2010 | Saltzman et al. | |
| 2010/0023353 A1* | 1/2010 | Stoffiere | 705/4 |
| 2010/0030798 A1 | 2/2010 | Kumar et al. | |
| 2010/0046792 A1 | 2/2010 | Anderson et al. | |
| 2010/0046827 A1 | 2/2010 | Anderson et al. | |
| 2010/0070265 A1* | 3/2010 | Nelson et al. | 704/8 |
| 2010/0077301 A1 | 3/2010 | Bodnick et al. | |
| 2010/0082382 A1 | 4/2010 | Kisin et al. | |
| 2010/0082548 A1 | 4/2010 | Crockett et al. | |
| 2010/0082555 A1 | 4/2010 | Ogawa et al. | |
| 2010/0082676 A1 | 4/2010 | Paknad et al. | |
| 2010/0097662 A1 | 4/2010 | Churilla et al. | |
| 2010/0106685 A1 | 4/2010 | Ott et al. | |
| 2010/0107156 A1 | 4/2010 | Andersen et al. | |
| 2010/0114832 A1 | 5/2010 | Lillibridge et al. | |
| 2010/0125664 A1 | 5/2010 | Hadar et al. | |
| 2010/0131470 A1 | 5/2010 | Schmidt | |
| 2010/0138500 A1 | 6/2010 | Consul et al. | |
| 2010/0138653 A1 | 6/2010 | Spencer et al. | |
| 2010/0145932 A1 | 6/2010 | Rook et al. | |
| 2010/0146056 A1 | 6/2010 | Consul et al. | |
| 2010/0146299 A1 | 6/2010 | Swaminathan et al. | |
| 2010/0161313 A1 | 6/2010 | Karttunen | |
| 2010/0161314 A1 | 6/2010 | Karttunen et al. | |
| 2010/0161639 A1 | 6/2010 | Bobrow et al. | |
| 2010/0185875 A1 | 7/2010 | Mayer et al. | |
| 2010/0198986 A1 | 8/2010 | Andersen et al. | |
| 2010/0205020 A1 | 8/2010 | Losey | |
| 2010/0306204 A1 | 12/2010 | Chitiveli et al. | |
| 2010/0306206 A1* | 12/2010 | Brassil et al. | 707/754 |
| 2011/0270826 A1 | 11/2011 | Cha et al. | |
| 2012/0191708 A1 | 7/2012 | Barsony et al. | |
| 2012/0192286 A1 | 7/2012 | Messing et al. | |
| 2012/0330946 A1* | 12/2012 | Arredondo et al. | 707/728 |
| 2013/0246430 A1 | 9/2013 | Szucs et al. | |
| 2014/0019371 A1* | 1/2014 | Albertelli | 705/311 |
| 2014/0067829 A1* | 3/2014 | Barney | G06F 17/30675 707/748 |

FOREIGN PATENT DOCUMENTS

| | | |
|---|---|---|
| EP | 2214109 A1 | 8/2010 |
| WO | WO-2008020860 A2 | 2/2008 |
| WO | WO-2008022187 A1 | 2/2008 |
| WO | WO-2008027477 A2 | 3/2008 |
| WO | WO-2008070415 A2 | 6/2008 |
| WO | WO-2008070688 A1 | 6/2008 |
| WO | WO-2008083211 A1 | 7/2008 |
| WO | WO-2008127257 A2 | 10/2008 |
| WO | WO-2009052265 A1 | 4/2009 |
| WO | WO-2009085239 A2 | 7/2009 |
| WO | WO-2009094521 A1 | 7/2009 |

(56) References Cited

FOREIGN PATENT DOCUMENTS

| WO | WO-2009102765 A2 | 8/2009 |
| WO | WO-2009129516 A1 | 10/2009 |
| WO | WO-2010022343 A2 | 2/2010 |
| WO | WO-2010022346 A2 | 2/2010 |
| WO | WO-2010051260 A1 | 5/2010 |
| WO | WO-2010065458 A2 | 6/2010 |

* cited by examiner

ELECTRONIC DISCOVERY SYSTEM WITH STATISTICAL SAMPLING

RELATED APPLICATION

This application claims priority to U.S. Pat. App. Ser. No. 61/592,493 filed on Jan. 30, 2012, the contents of which are hereby fully incorporated by reference.

TECHNICAL FIELD

The subject matter described herein relates to an electronic discovery system implementing an electronic discovery workflow that includes a statistical sampling tool that characterizes various metrics as part of the workflow.

BACKGROUND

The increasing pervasiveness of electronic communications and computer-generated documents has created enormous problems for lawyers and their clients, who are regularly challenged to sift through terabytes of information to find relevant, privileged or confidential material in a way that is accurate, consistent and yet cost-effective. When one case can require sorting through a terabyte of data, the result can be 75 million pages for review, taking up to 375,000 hours of time. Studies have estimated that document review accounts for 50 to 90 percent of the cost involved in litigation matters, and one report has suggested that 70 percent or more of the cost of discovery is now attributable solely to human review of documents for responsiveness and privilege.

The problem with purely human review of documents is not just a problem of time and money. It is one of consistency and accuracy as well. Dozens of reviewers working on thousands of documents a day are bound to sort and code documents differently based on their subjective judgments, experience levels, fatigue and other factors. Even with sound quality control checks, the risks of making a mistake are substantial, and the results can be devastating: discovery sanctions; loss of trade secrets; loss of attorney-client privilege; or a bad outcome at trial.

SUMMARY

In one aspect, a sampler tool for an electronic discovery system implementing an electronic discovery workflow is provided. This workflow can comprise, for example, aspects relating to an early case assessment, processing production, and/or document review system. The sampler tool defines a workflow, identifies a data set, then calculates results and generates reports and archival records. In particular, the sampler tool calculates and/or obtains various metrics characterizing the workflow and generates reports based on such metrics. These reports can serve as historical snapshots which can be used for quality control purposes and/or to provide support regarding the efficacy of all processes and/or systems associated with the workflow (e.g., a large scale document review, etc.).

The reports can be interactive and allow, for example, a user to modify the manner in which the various metrics are displayed and/or obtain data/documents used to calculate the various metrics. The sampler tool can be implemented as a client application or it can be part of a distributed computing system including applications/modules executing on different and remote computing systems. The sampler tool can generate the metrics by accessing one or more data sources directly or it can access/interact with one or more applications. Such applications can provide the documents to the sampler tool in order to define a sampling set and/or the applications can provide one or more of the reported metrics directly (i.e., the sampler tool can generate and/or assemble the metrics, etc.).

In another aspect, a sampler tool obtains data from a plurality of applications and/or data sources that are used to implement a software-based electronic discovery workflow. The electronic discovery workflow in turn is used to categorize each of a plurality of documents for potential production in connection litigation discovery. The obtained data characterizes a current state of at least one aspect of the electronic discovery workflow. Thereafter, at least one metric is calculated based on the obtained data so that a report can be generated based on the calculated at least one metric. Subsequently, data characterizing the report can be provided.

Providing data can include or more of displaying at least a portion of the report in a graphical user interface, loading at least a portion of the report, storing at least a portion of the report, and transmitting at least a portion of the report. The obtaining, generating, and/or providing can be implemented by at least one data processor forming part of at least one computing system.

The data can be obtained from the applications via corresponding application programming interfaces (APIs) for each of the applications.

The current subject matter can be applied to varying types of documents, including, for example, but not limited to: word processing documents, spreadsheet documents, electronic presentations, e-mails, audio files, images, videos, data objects, computer code, container files, system files, log files, redactions, CAD files, program files, metadata, case information, custodian information, and project files.

In some cases, a user can define aspects/parameters of the electronic discovery workflow that they would like analyzed as part of a report. For example, the user can specify aspects via a graphical user interface and the data obtained from the applications and/or data sources can be tailored appropriately.

The report can characterize various types of metrics including, for example, completion rate, error rate, performance in relation to pre-defined benchmarks, confidence level, error margin, precision, recall, F-measure, accuracy for at least a portion of the electronic discovery workflow, efficacy level for screening or review of potentially privileged data, accuracy level of specific classes of decisions, differentiation among levels of materiality, proper categorization of documents, and sample size.

In some cases, the graphical user interface that displays the report can include at least one graphical user interface element, which when activated, causes information complementary to the report to be displayed. This complementary information can be any type of information that provides further details regarding the analytics displayed in the report. For example, the complementary information can include documents or portions thereof used to calculate the at least one metric. The complementary information can also include the raw data (i.e., the obtained data) that is used to calculate the at least one metric. Further, the complementary information can include at least one categorization decision assigning at least one document to a particular category.

The graphical user interface can allow a user to modify one or more aspects relating to the complementary information including, for example, changing the at least one categorization decision for a document/set of documents, etc. Data can be subsequently transmitted to at least one of the plurality of applications and/or data sources characterizing the changed at least one categorization decision. If any changes are made to the report, after the data is transmitted, a modified version of the report can be rendered that accommodates the changes (e.g., the changed at least one categorization decision, etc.)

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides a wide variety of metrics that characterize how a large-scale document review is progressing. Not only can these metrics be used to adjust certain parameters relating to the assessment, processing, production or document review process/workflow (which aid quality control processes), these metrics can provide historical snapshots that in turn can support the effectiveness of the overall process (in cases when the results are challenged, etc.). More specifically, the current subject matter incorporates statistical theory, legal principles and litigation support technology synthesized and simplified to address the following needs:

Validation of the efficacy of data selection generally
Validation of the efficacy of custodian selection
Validation of the efficacy of queries or keyword screening
Validation of the efficacy of various screening methodologies for the identification of privileged information
Estimation of richness of defined elements (categorization or classification item type, duplicate item, probative item) by grouping (custodian, data source, document type, date range)
Validation of the efficacy of predictive coding
Estimation of the accuracy of categorization by grouping (source, category or class, item type, file size, date/time range, evaluators)
Validation of the efficacy of human-based document review
Validation of the quality of individual document reviewer performance
Assistance in project planning and budgeting The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
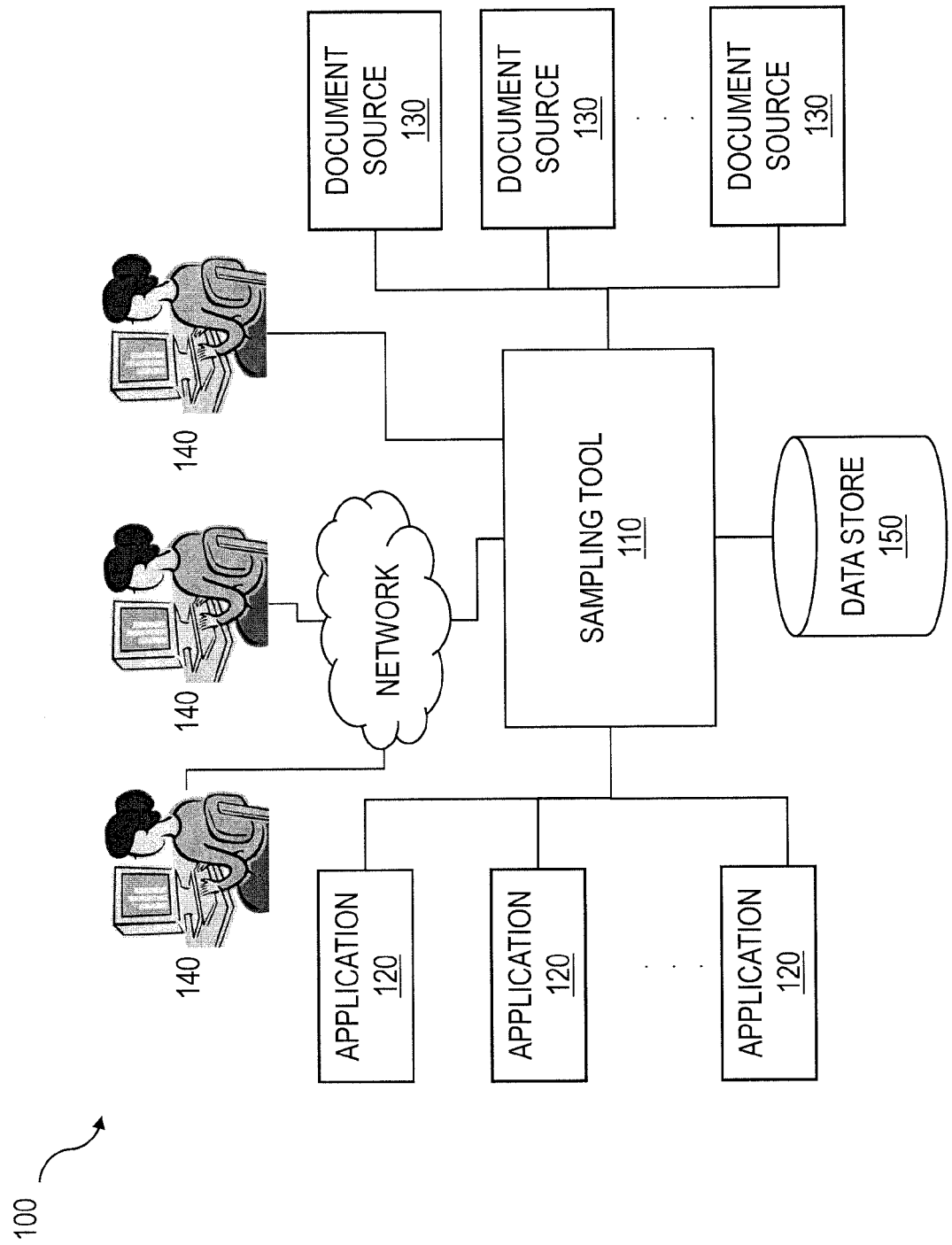
FIG. 1 is a system diagram illustrating a sampling and reporting system.

FIG. 1 is a system diagram 100 illustrating a sampler tool 110 that is coupled (either directly or via a network such the Internet, etc.) to a plurality of applications 120 used as part of an overall assessment, processing, production and/or electronic discovery workflow as well as data sources 130. The sampler tool 110 can be a standalone application or it can be integral with one or more of the applications 120. The applications 120 can be stand-alone applications (in some cases offered by differing vendors) or they can form modules of part of a larger application. As will be described in further detail below, the sampler tool 110 (i) generates metrics based on data obtained from the plurality of applications 120 and/or the data sources 130 and/or (ii) obtains metrics from the plurality of applications 120 and the data sources 130 that characterize various aspects of an overall electronic discovery workflow. The sampler tool 110 accesses the applications 120 via corresponding APIs (and can conversely be accessed via its own API). The sampler tool 110 can be accessed by a plurality of users 140 either directly or through a networked connection. In addition, the sampler tool 110 is coupled to a data store 150 that stores reports at different snapshots during the progression of a document review process.

The current subject matter can be implemented in connection with a wide variety of platforms including, without limitation, the platform (and related systems, methods, and articles) described in co-pending application Ser. No. 13/014,643, the contents of which are hereby fully incorporated by reference, as well as the i-Decision® platform by DiscoverReady LLC.

The sampler tool 110 is an analytical module that allows a user to define what they want to measure in relation to an overall electronic discovery workflow, and gives them tools to design and implement appropriate study protocols to statistically measure the results. This sampling and analysis can be applied to any objects or items not just documents or files, and it applies to organization systems, data capture systems, review platforms and any other tools required in legal and litigation support.

As used herein and unless explicitly stated otherwise, the term documents can be construed to include: documents (word processing documents, spreadsheet documents, etc.), presentations, e-mails), files (audio files, images, videos, etc.), objects (e.g., data objects, etc.), and other items (unless otherwise stated). More specifically, the term documents can be construed to comprise: spreadsheets, presentations, computer code, container files, emails, images, system files, log files, redactions, drawings, CAD files, program files, metadata, case information, custodian information, project files, or any other information relevant in an electronic discovery.

The sampler tool 110 incorporates and simplifies sound statistical sampling processes into an easy-to-use interface, allowing non-technical laymen with no expertise of statistical sampling theories or best practices to input a minimum amount of baseline data and expectations from which the tool will output both a statistically sound process and the statistically sound results of those processes. The sampler tool 110 can be accessed by users 140 either directly (e.g., a client application, etc.) or from a remote server (e.g., via a web service). The interface can form part of a resident client application or it can be rendered as part of a web browser.

Figure 2:
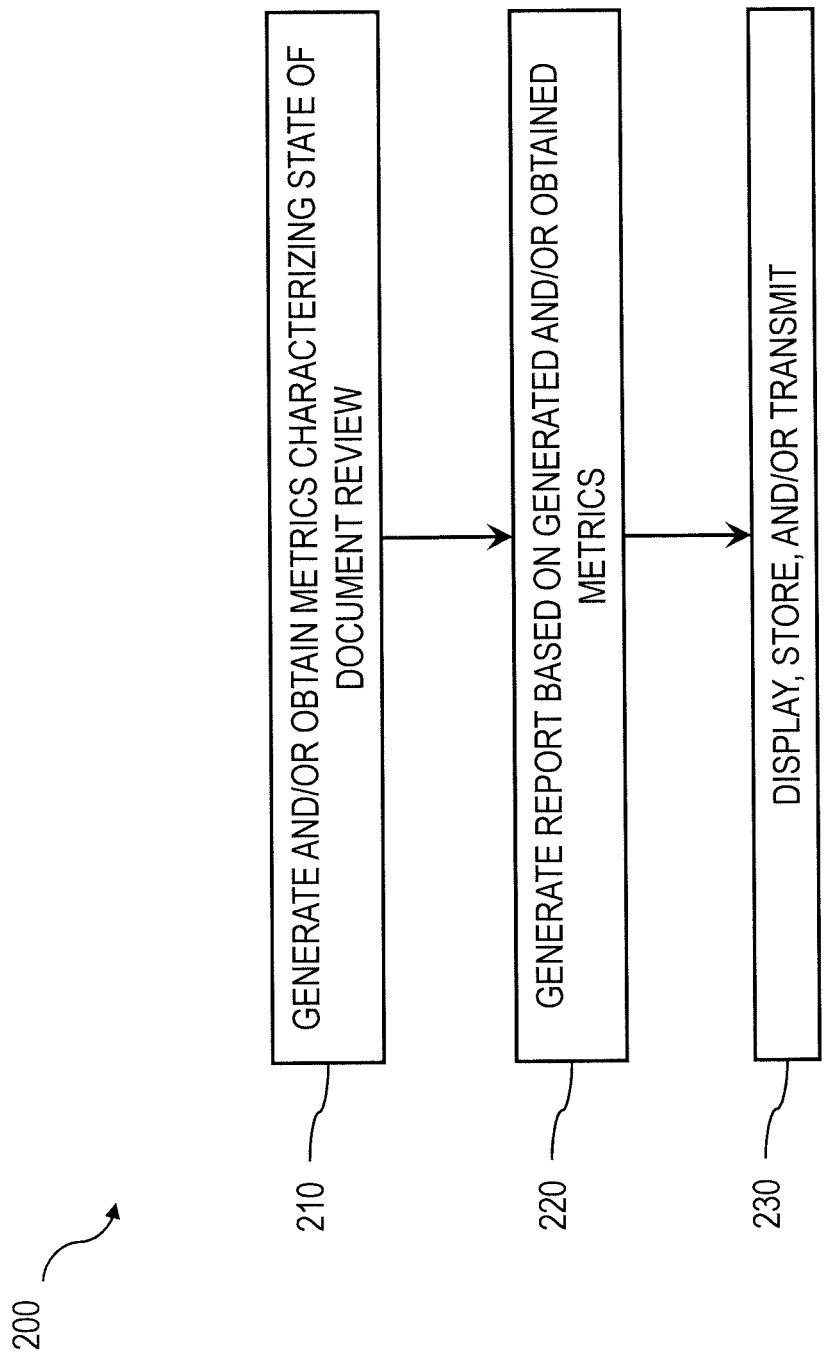
FIG. 2 is a process flow diagram illustrating the generation of a report using a system such as illustrated in FIG. 1.
Figure 3:
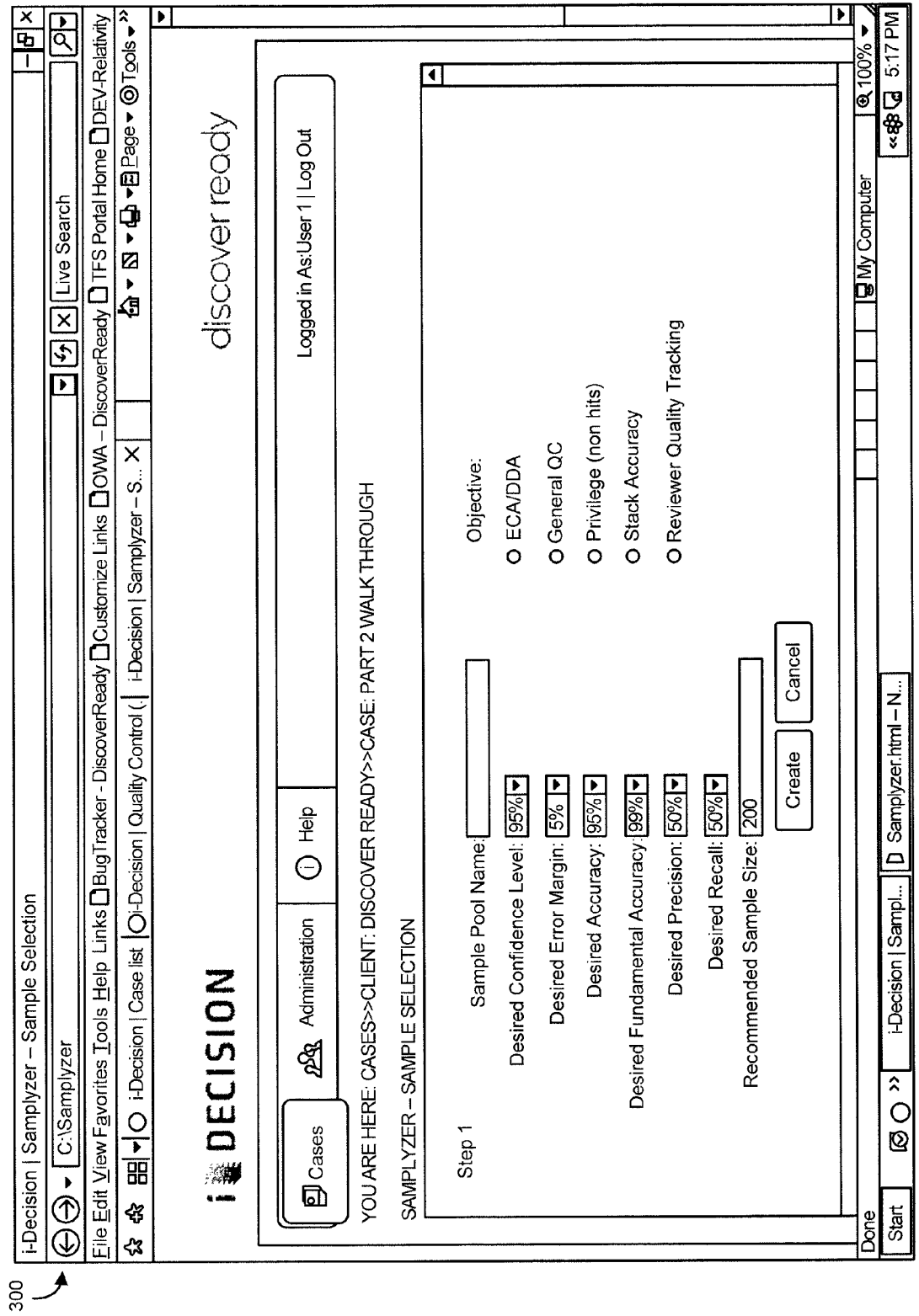
FIGS. 3-6 are a sample report generated by a sampling and reporting system as in FIG. 1.
Figure 4:
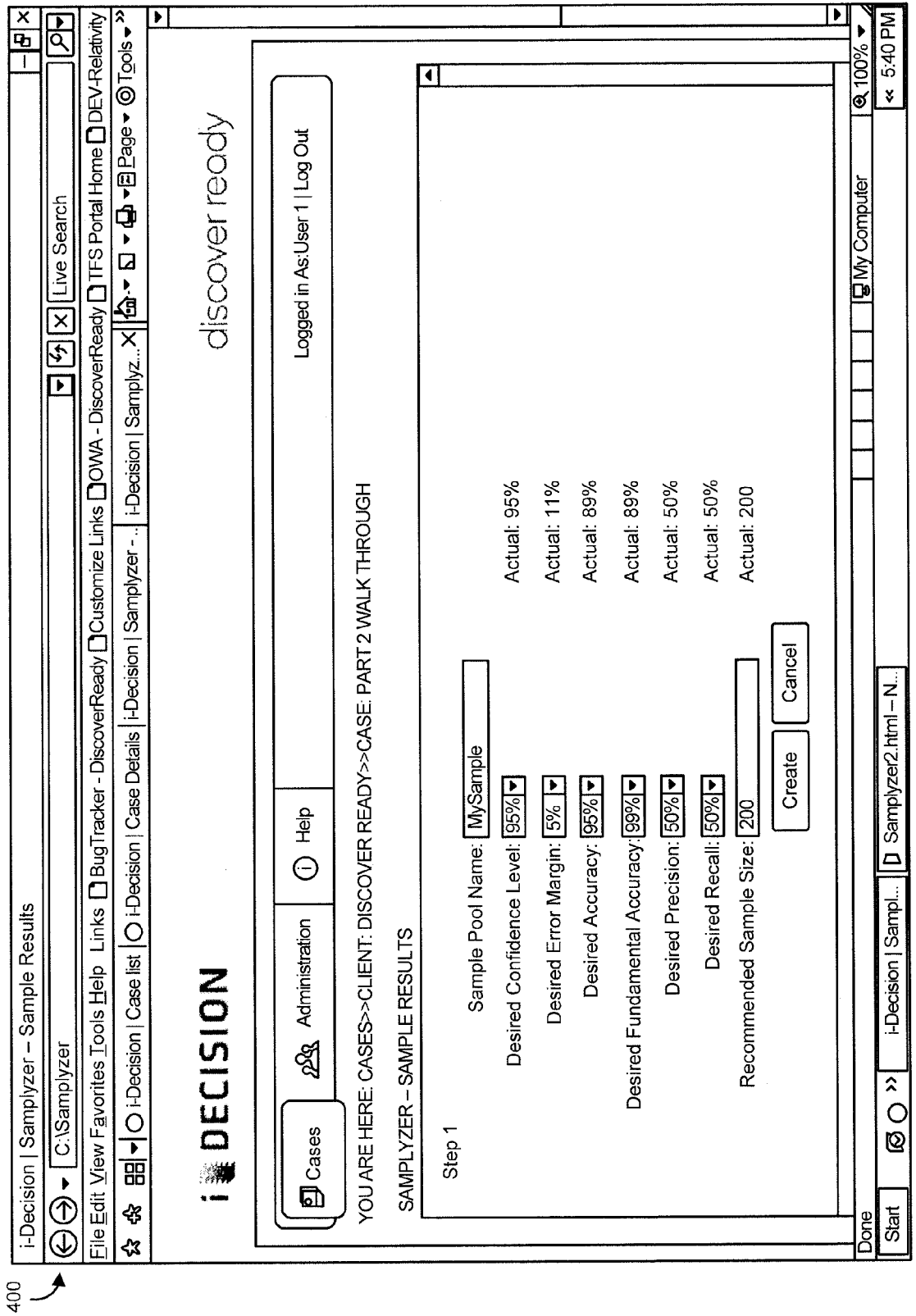
Figure 5:
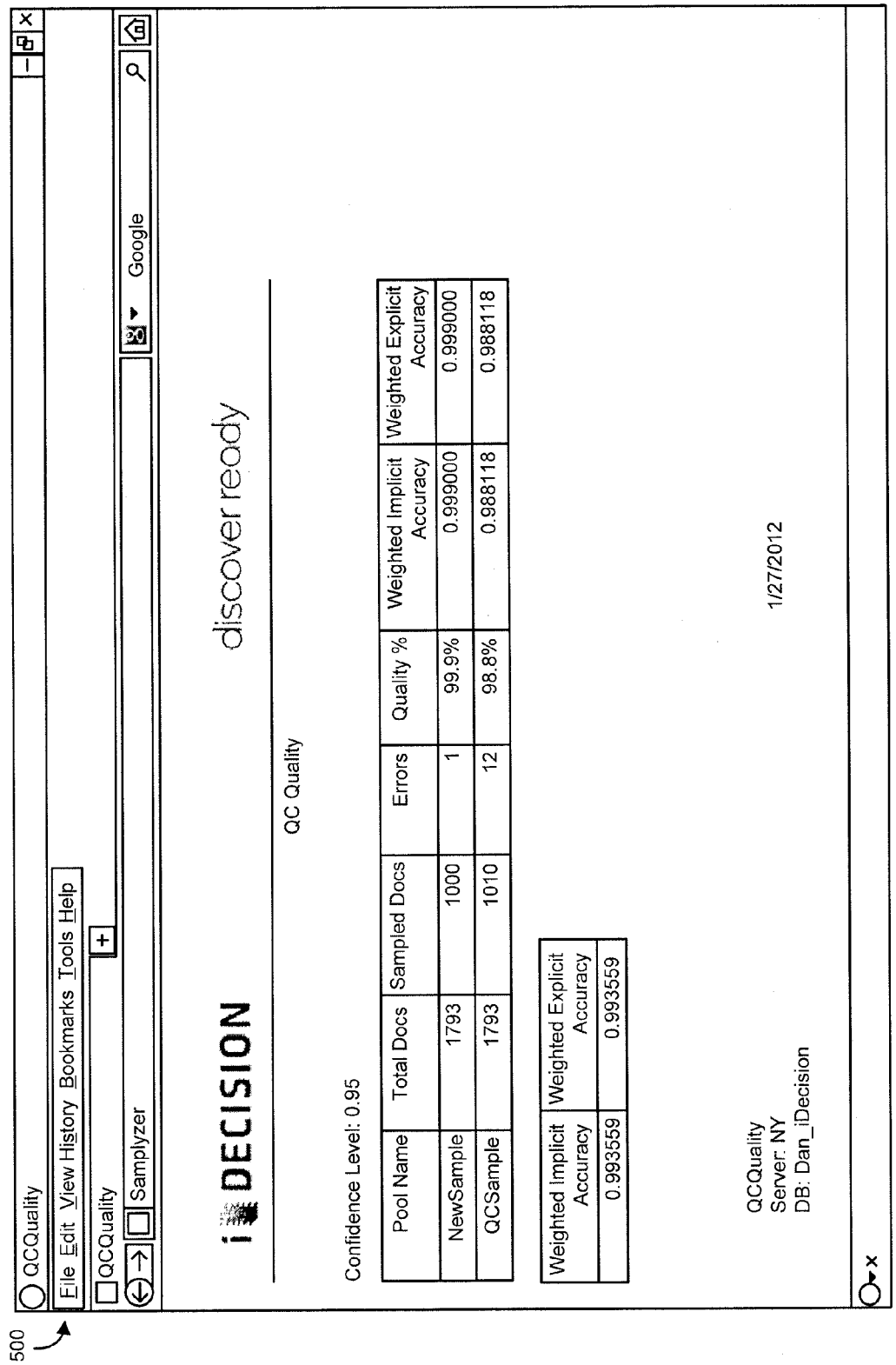
Figure 6:
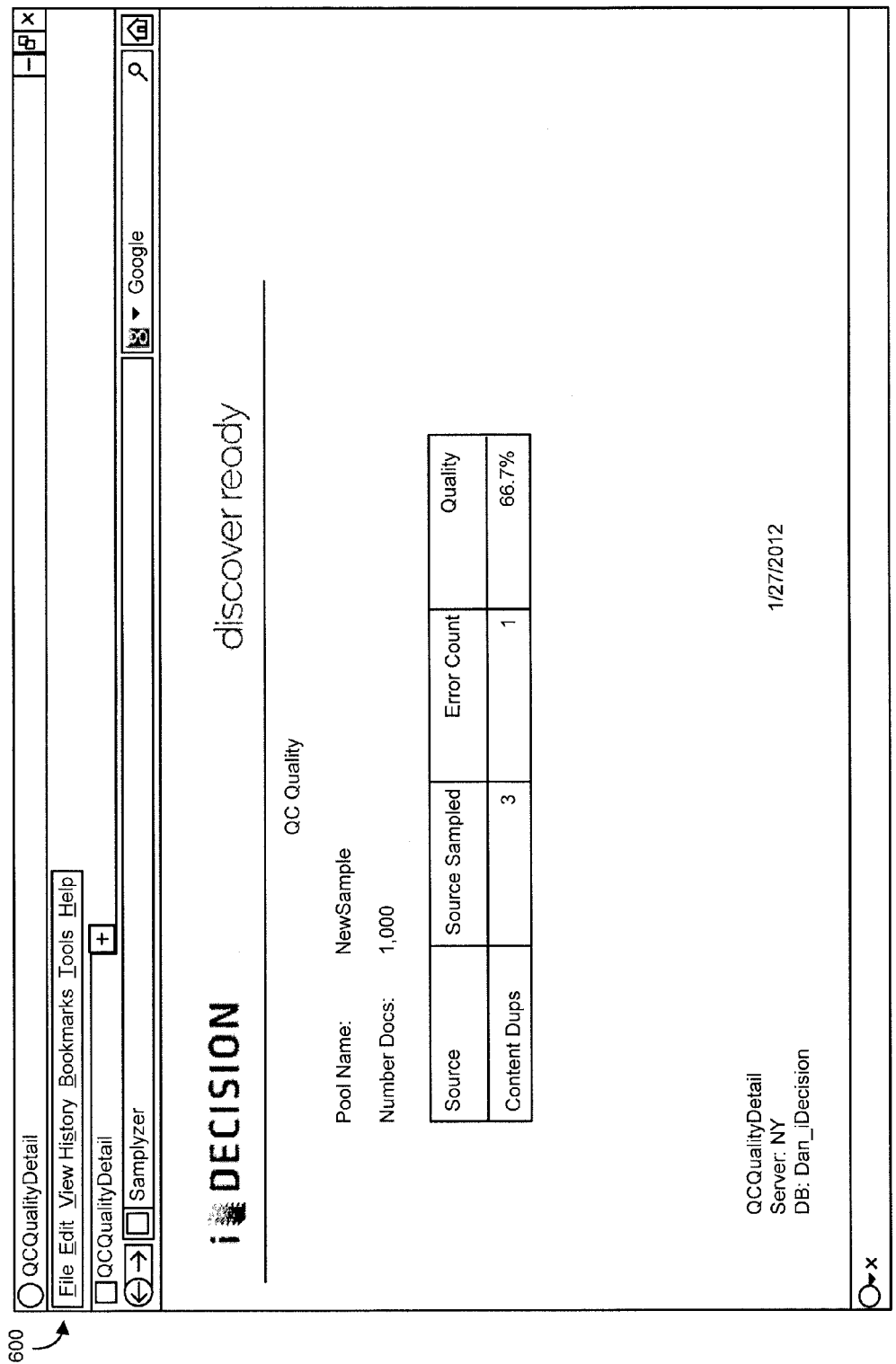

FIG. 2 is a process flow diagram 200 illustrating a method in accordance with the current subject matter in which, at 210, metrics are generated or obtained characterizing a state (completion, error rate, etc.) of a large-scale electronics discovery project. Thereafter, using such metrics, at 120, a report is generated. This report is then, at 130, displayed (to an end user), stored (to allow for subsequent access), or transmitted (for example to an end user to render on a remote computer and/or to be stored in a data repository, etc.).

FIGS. 3-6 illustrate sample reports 300-600 that characterizes certain aspects of an electronic discovery workflow. This sample report 300 can, for example, be generated by the sampler tool 110 and stored in the data store 150. In some cases, a separate reporting server (not shown) can be used to generate and/or delivery reports generated by or using data from the sampler tool 110. In these reports, users can select the objective, set the appropriate settings and see the results of the sampling study. As can be appreciated, the sampler tool 110 provides legal counsel a self-contained statistically sound methodology and interface for sampling and analyzing the efficacy of various electronic discovery processes. Quality control professionals also benefit by using the sampler tool 110, for example, by being able to exclude documents from their sample set that have neither a clear right nor a clear wrong answer.

The reports 300-600 can include one or more graphical user interface elements, which when activated via a corresponding interface, cause complementary information to be displayed. In some cases, the underlying documents used to calculate certain metrics can be displayed (either as part of the sampler tool 110 interface or by launching another module/application). In other cases, a finer level of detail (e.g. data used to generate the corresponding metric(s), etc.) can be displayed. Decisions or other metrics regarding such underlying documents can be modified/adjusted which can cause, for example, a write-back to the data store 110. This write-back can result in the report 300-600 being accordingly modified and re-rendered to reflect the changes. In addition, the reports 300-600 can provide other types of interactivity including detail zoom, rendering the metrics in various types of charts/graphs, and the like.

The sampler tool 110 can be customized to generate a wide variety of metrics. These metrics may be user-defined (or have user-defined parameters) or they can be pre-set. Example inputs to the sampler tool 110 can include various benchmarks that can be used to compare with generated/obtained metrics. Example benchmarks (desired and actual) can include, for example, confidence level (for early case assessment and data analysis purposes) and error margin for the results of any sampling process, precision, recall and F-measure for the selection of data for the case (early case assessment and keyword search efficacy), accuracy reporting for the document review process generally and for measuring the quality of any specific document review assignment, efficacy level for the screening or review of potentially privileged data, accuracy level of specific classes of decisions (e.g. category, privilege, confidentiality, etc.), differentiating between levels of materiality to create distinct reports of "absolute" accuracy and "fundamental" accuracy (for the most material aspects of the decision-making process), characterizing whether defined groups/stacks of documents are properly coded for privilege or major category, and recommended sample size (i.e., the number of documents used directly or indirectly by the sampler tool 110 to generate the metrics). These benchmarks can be compared, for example, against the metrics obtained by the sampler tool 110 and included within, for example, reports 300-400 as in FIGS. 3-4.

In some implementations, a sampler tool 110 can be implemented in connection with a multi-tiered analysis and QC system such as the i-Decision platform and/or as described in co-pending application 61/592,487 filed on Jan. 30, 2012, the contents of which are hereby fully incorporated by reference). With such an arrangement, a first tier of QC can require a random sampling of documents in order to provide a statistically sound quality measurement at an appropriate confidence level and margin of error. The random sampling can be taken from all documents and be sufficiently large to allow for error rate contribution analysis and human review accuracy estimates (i.e., a second tier QC analysis); using additional rules ensuring that there are enough representative documents from each source (content analysis, stacking, relevance, and human review) such that each source's statistical accuracy and margin of error can be derived. The overall quality of the review can include all propagation target documents, e.g. file hash & content duplicates, stacks, and predictive categorization logic). The population from which the sample is drawn can be recorded so that any statements about the statistical measured accuracy can be attributed to that set. All sampled documents can be placed into QC assignments for human evaluation. The review can be a "blind" (unbiased) re-review of the document decisions or an "agree/disagree" determination. In a blind re-review, QC document decisions can have their new decision recorded within a module or table tracking the source of this change. Reports can be run that provide statistical information on the accuracy of the decisions sampled, and provide the statistical accuracy and margin of error for both the load and the entire case.

Error rate reports can be run that provide statistical information on the accuracy of the decisions sampled and provide the statistical accuracy and margin of error for the load and the entire case and for each individual decision source/propagation method. If the quality level returned from a second tier QC review is below acceptable criteria, then appropriate remediation processes will occur to address quality in document sets affected by the identified process (es). At this time, the remediation processes can be being defined for each source and each source has a specific remediation pathway.

Figure 7:
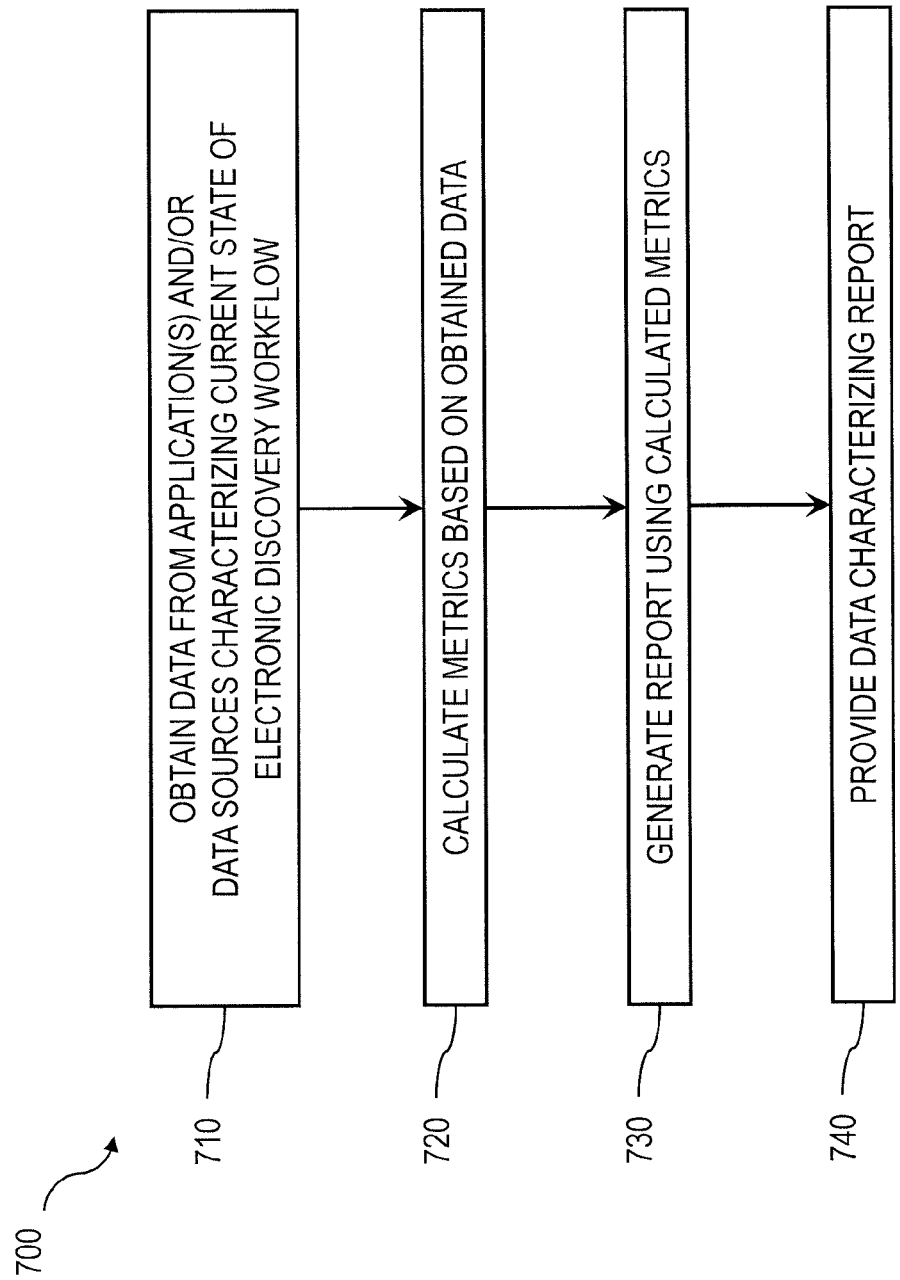
FIG. 7 is a process flow diagram illustrating generation of a report characterizing metrics associated with an electronic discovery workflow.

FIG. 7 is a process flow diagram 700 illustrating, in which, at 710, data is obtained from a plurality of applications and/or data sources used to implement a software-based electronic discovery workflow. The electronic discovery workflow, in this scenario, is used to categorize each of a plurality of documents for potential production in connection litigation discovery. In addition, the obtained data characterizes a current state of at least one aspect of the electronic discovery workflow. Subsequently, at 720, at least one metric is calculated based on the obtained data so that, at 730, a report is generated based on the calculated at least one metric. Data characterizing the report can later, at 740, be provided (e.g., displayed, loaded, stored, transmitted, etc.).

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A computer-implemented method comprising:
obtaining, by at least one data processor and by a sampler tool, data from a plurality of applications and data sources used to implement a software-based electronic discovery workflow, the electronic discovery workflow being used to categorize each of a plurality of documents for potential production in connection with litigation discovery, the obtained data characterizing a current state of at least one aspect of the electronic discovery workflow;
generating, by the at least one data processor, at least one benchmark input field on a graphical user interface, each of the at least one benchmark input field accepting a user-defined benchmark describing a desired statistical feature of the data;
displaying, by the at least one data processor, on the graphical user interface, a recommended sample size indicating a number of documents that are likely needed to achieve at least one of the desired statistical features;

calculating, by the at least one data processor, based on the user-defined benchmarks and the data, at least one metric, each of the at least one metric corresponding to an actual statistical feature of the data with the recommended sample size;

displaying, by the at least one data processor, on the graphical user interface, the at least one metric;

generating, by the at least one data processor, a report based on the at least one metric;

displaying, on the graphical user interface, the report to a user;

providing, by the at least one data processor, data characterizing the report to a data store;

updating, by the at least one data processor with a write-back operation to the data store, an updated report based on detected changes in the at least one benchmark input field;

providing, by the at least one data processor, updated data characterizing the updated report; and displaying, on the graphical user interface, the updated report to the user.

2. A method as in claim 1, wherein providing data comprises at least one of: displaying, by at least one data processor, at least a portion of the report in a graphical user interface, loading, by at least one data processor, at least a portion of the report, storing at least a portion of the report, and transmitting, by at least one data processor, at least a portion of the report.

3. A method as in claim 1, wherein the data is obtained from the applications via corresponding application programming interfaces (APIs) for each of the applications.

4. A method as in claim 1, wherein the documents are selected from a group consisting of: word processing documents, spreadsheet documents, electronic presentations, e-mails, audio files, images, videos, data objects, computer code, container files, system files, log files, redactions, CAD files, program files, metadata, case information, custodian information, and project files.

5. A method as in claim 1, further comprising:
receiving, by at least one data processor via a graphical user interface, user-generated input specifying aspects relating to the electronic discovery workflow for analysis;
wherein the obtained data is based on the specified aspects in the user-generated input.

6. A method as in claim 1, wherein the at least one metric is selected from a group of metrics relating to the electronic discovery workflow consisting of: completion rate, error rate, performance in relation to pre-defined benchmarks, confidence level, error margin, precision, recall, F-measure accuracy for at least a portion of the electronic discovery workflow, efficacy level for screening or review of potentially privileged data, accuracy level of specific classes of decisions, differentiation among levels of materiality, proper categorization of documents, and sample size.

7. A method as in claim 1, wherein providing data comprises: displaying, by at least one data processor, at least a portion of the report in a graphical user interface, the graphical user interface comprising at least one graphical user interface element having associated complementary information, wherein the method further comprises:
receiving, by at least one data processor via the graphical user interface, user-generated input activating the at least one graphical user interface element; and displaying, by at least one data processor in the graphical user interface, the associated complementary information.

8. A method as in claim 7, wherein the associated complementary information comprises at least a portion of a document used to calculate the at least one metric.

9. A method as in claim 7, wherein the associated complementary information comprises at least a portion of the obtained data.

10. A method as in claim 7, wherein the associated complementary information comprises at least one categorization decision assigning at least one document to a particular category.

11. A method as in claim 10, further comprising:
receiving, by at least one data processor, via the graphical user interface, user-generated input changing the at least one categorization decision; and
transmitting, by at least one data processor, data to at least one of the plurality of applications and data sources characterizing the changed at least one categorization decision.

12. A method as in claim 11, further comprising:
modifying, by at least one data processor, the displayed report to accommodate the changed at least one categorization decision.

13. A non-transitory computer program product storing instructions, which when executed by at least one data processor of at least one computing system, result in operations comprising:
obtaining, by a sampler tool, data from a plurality of applications and data sources used to implement a software-based electronic discovery workflow, the electronic discovery workflow being used to categorize each of a plurality of documents for potential production in connection with litigation discovery, the obtained data characterizing a current state of at least one aspect of the electronic discovery workflow;
generating at least one benchmark input field on a graphical user interface, each of the at least one benchmark input field accepting a user-defined benchmark describing a desired statistical feature of the data;
displaying, on the graphical user interface, a recommended sample size indicating a number of documents that are likely needed to achieve at least one of the desired statistical features;
calculating, based on the user-defined benchmarks and the data, at least one metric, each of the at least one metric corresponding to an actual statistical feature of the data with the recommended sample size;
displaying, on the graphical user interface, the at least one metric;
generating a report based on the at least one metric;
displaying, on the graphical user interface, the report to a user;
providing data characterizing the report to a data store;
updating, by a write-back operation to the data store, an updated report based on detected changes in the at least one benchmark input field;
providing updated data characterizing the updated report; and
displaying, on the graphical user interface, the updated report to the user.

14. A computer program product as in claim 13, wherein providing data comprises at least one of: displaying at least a portion of the report in the graphical user interface, loading at least a portion of the report, storing at least a portion of the report, and transmitting at least a portion of the report.

15. A computer program product as in claim 13, wherein the data is obtained from the applications via corresponding application programming interfaces (APIs) for each of the applications.

16. A computer program product as in claim 13, wherein the documents are selected from a group consisting of: word processing documents, spreadsheet documents, electronic presentations, e-mails, audio files, images, videos, data objects, computer code, container files, system files, log files, redactions, CAD files, program files, metadata, case information, custodian information, and project files.

17. A computer program product as in claim 13, wherein the at least one metric is selected from a group of metrics relating to the electronic discovery workflow consisting of: completion rate, error rate, performance in relation to pre-defined benchmarks, confidence level, error margin, precision, recall, F-measure accuracy for at least a portion of the electronic discovery workflow, efficacy level for screening or review of potentially privileged data, accuracy level of specific classes of decisions, differentiation among levels of materiality, proper categorization of documents, and sample size.

18. A computer program product as in claim 13, wherein providing data comprises: displaying at least a portion of the report in the graphical user interface, the graphical user interface comprising at least one graphical user interface element having associated complementary information, wherein the wherein the operations further comprise:
 receiving, via the graphical user interface, user-generated input activating the at least one graphical user interface element; and
 displaying, in the graphical user interface, the associated complementary information.

19. A computer program product as in claim 18, wherein the associated complementary information comprises at least a portion of a document used to calculate the at least one metric.

20. A computer program product as in claim 18, wherein the associated complementary information comprises at least a portion of the obtained data.

21. A computer program product as in claim 18, wherein the associated complementary information comprises at least one categorization decision assigning at least one document to a particular category.

22. A computer program product as in claim 21, wherein the operations further comprise:
 receiving, via the graphical user interface, user-generated input changing the at least one categorization decision; and
 transmitting data to at least one of the plurality of applications and data sources characterizing the changed at least one categorization decision.

23. A computer program product as in claim 22, wherein the operations further comprise:
 modifying the displayed report to accommodate the changed at least one categorization decision.

24. A system comprising:
 at least one data processor; and
 memory storing instructions, which when executed by the at least one data processor, result in operations comprising:
  obtaining, by a sampler tool, data from a plurality of applications and data sources used to implement a software-based electronic discovery workflow, the electronic discovery workflow being used to categorize each of a plurality of documents for potential production in connection with litigation discovery, the obtained data characterizing a current state of at least one aspect of the electronic discovery workflow;
  generating at least one benchmark input field on a graphical user interface, each of the at least one benchmark input field accepting a user-defined benchmark describing a desired statistical feature of the data;
  displaying, on the graphical user interface, a recommended sample size indicating a number of documents that are likely needed to achieve at least one of the desired statistical features;
  calculating, based on the user-defined benchmarks and the data, at least one metric, each of the at least one metric corresponding to an actual statistical feature of the data with the recommended sample size;
  displaying, on the graphical user interface, the at least one metric;
  generating a report based on the at least one metric;
  displaying, on the graphical user interface, the report to a user;
  providing data characterizing the report to a data store;
  updating, by a write-back operation to the data store, an updated report based on detected changes in the at least one benchmark input field;
  providing updated data characterizing the updated report; and
  displaying, on the graphical user interface, the updated report to the user.

\* \* \* \* \*